US006695256B2

(12) United States Patent
Zeender et al.

(10) Patent No.: US 6,695,256 B2
(45) Date of Patent: Feb. 24, 2004

(54) CRYOGENIC PROPELLANT DEPLETION SYSTEM FOR A LAUNCH VEHICLE

(75) Inventors: Peter Zeender, Littleton, CO (US); Joseph Patrick Wurst, Littleton, CO (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 10/057,224

(22) Filed: Jan. 25, 2002

(65) Prior Publication Data
US 2002/0175247 A1 Nov. 28, 2002

Related U.S. Application Data
(60) Provisional application No. 60/292,713, filed on May 22, 2001.

(51) Int. Cl.[7] .............................................. G01F 23/22
(52) U.S. Cl. ..................... 244/135 R; 702/55; 73/290 V
(58) Field of Search .......................... 244/135 R, 158 R, 244/172, 135 C; 73/290 V, 290 B, 149; 702/55; 340/618

(56) References Cited

U.S. PATENT DOCUMENTS

| 4,898,030 A | * | 2/1990 | Yeh .......................... 244/135 R |
| 4,908,776 A | * | 3/1990 | Crill et al. ................. 73/290 V |
| 5,148,674 A | * | 9/1992 | Morris ........................ 60/39.27 |
| 5,251,852 A | * | 10/1993 | Pulkowski et al. ...... 244/135 C |
| 5,660,358 A | * | 8/1997 | Grafwallner et al. ... 244/135 R |
| 5,823,478 A | | 10/1998 | Dunn .......................... 244/172 |
| 5,961,074 A | | 10/1999 | Dunn .......................... 244/135 |
| 6,113,032 A | * | 9/2000 | Cochran et al. ......... 244/135 R |
| 6,119,985 A | * | 9/2000 | Clapp et al. ............. 244/135 R |
| 6,283,412 B1 | | 9/2001 | Mango ........................ 244/135 |

OTHER PUBLICATIONS

Pending U.S. patent application No. 10/052,126 entitled "Propellant Utilization System" by Fisher et al, filed on Jan. 17, 2002 and assigned to Lockheed Martin Corporation.

* cited by examiner

Primary Examiner—Galen L. Barefoot
(74) Attorney, Agent, or Firm—Marsh Fischmann & Breyfogle LLP

(57) ABSTRACT

A cryogenic propellant depletion system for maximizing cryogenic propellant use in a space launch vehicle. The cryogenic propellant depletion system utilizes a plurality of pressure measurements to monitor one or more parameters of the cryogenic propellant in a feed line interconnecting a cryogenic propellant storage tank to the launch vehicle's engine. In this regard, the cryogenic depletion system includes a processor and supported logic to determine a head pressure supplied by the cryogenic propellant in the feed line and the mass of the cryogenic propellant in the feed line. The cryogenic depletion monitoring system is operative to determine these propellant parameters irrespective of a two-phase flow existing in the feed line. Finally, the system is configured to initiate engine shut down when at least one of the determined propellant parameters falls below a minimum threshold value.

35 Claims, 7 Drawing Sheets

CRYOGENIC PROPELLANT DEPLETION SYSTEM FOR A LAUNCH VEHICLE

CROSS REFERENCE TO RELATED APPLICATIONS

This application claims priority from U.S. Provisional Application Serial No. 60/292,713, that was filed on May 22, 2001, that is titled "Cryogenic Propellant Depletion System for Launch Vehicle," and the entire disclosure of which is incorporated by reference in its entirety herein.

FIELD OF THE INVENTION

The invention is related to the field of space launch vehicles for use in launching a payload from a stationary ground-based position into orbit, and specifically to a cryogenic propellant depletion system for maximizing the utilization of cryogenic propellant by the booster stage of the space launch vehicle.

BACKGROUND OF THE INVENTION

Launch vehicles are generally used to launch payloads, such as satellites or scientific equipment, from the Earth's surface into space. Launch vehicles generally include one or more rocket engines arranged to fire at different times, or stages, as the launch vehicle travels from the earth's surface into orbit. The different stages are fired sequentially and typically include at least a first stage or "booster" stage and a second upper stage. The booster stage is designed to launch and deliver the payload a predetermined distance above the earth before exhaustion. Upon exhaustion, the booster stage and upper stage separate whereupon the upper stage is fired the to deliver the payload the remainder of the distance into a desired orbit. In the case where the booster stage is a reusable component, the booster stage controllably falls back to the earth's surface upon separation for retrieval, refitting, and future use.

The booster stage's rocket engine(s) typically utilize liquid propellants and in the case of bi-propellant rockets generally include two or more propellant tanks, booster pumps, a combustion chamber, plumbing interconnecting the various components, and a nozzle for accelerating and/or discharging the combustion product. Liquid propellant rockets generally utilize a liquid fuel such as RP-1 (i.e., kerosene) and an oxidizer such as liquid oxygen (LOX), which are stored in separate propellant tanks and brought into contact in the combustion chamber to provide thrust.

In order to preserve the booster stage rocket engine for re-use, the engine must be properly shut down at or near the end of the launch boost stage. That is, the engine must be shut down prior to violating any engine requirements that may result in some sort of permanent engine or vehicle damage. For, example, reusable rocket engines generally require that the propellant(s) be supplied with a minimum "head" pressure in order for the engine to properly function. As the propellant in one or both of the propellant tanks nears exhaustion, the head pressure generally drops. This head pressure drop may potentially result in engine and/or booster pump damage if the head pressure drops below a minimum allowable threshold (i.e., engine requirement). Further, proper engine shut down generally requires a predetermined mass of one or both of the propellants to prevent engine and/or booster pump damage which my result in catastrophic failure. Therefore, it is important to initiate engine shut down prior to the propellant(s) dropping below any minimum allowable threshold, in both reusable and expendable booster rockets. However, initiating engine shut down to prevent engine damage and/or rocket failure must be balanced with the desire to fully utilize the available propellant to maximize the launch vehicle's booster stage performance. As will be appreciated, it is desirable to utilize the propellant right up until the last possible moment prior to exceeding a minimum allowable threshold in order to maximize boost. Accordingly, it is desirable to continuously monitor the amount of the propellant remaining such that engine shut down may be initiated just prior to the propellant dropping below any minimum allowable threshold.

Existing propellant monitoring systems generally utilize hot point sensors which indicate a transition between liquid to gas in the propellant supply system through, for example, a change in a monitored capacitance. In these systems booster engine cut off (BECO) is initiated a predetermined time after the propellant level drops below one of the hot point sensors. Unfortunately, it is often difficult to precisely determine the amount of the remaining propellant using hot point sensors when a two-phase mixture of the propellant and/or an ullage gas exist in the system. This is especially true with cryogenic propellants which are susceptible to "boiling off" (i.e., liquid oxygen to gaseous oxygen) and which may introduce a two-phase mixture into the cryogenic storage tank and the plumbing interconnecting the storage tank to the rest of the system. Two-phase mixtures of the cryogenic propellants make determination of the remaining propellant parameters difficult as hot point sensors may prematurely or belatedly indicate the remaining level/pressure of propellant or otherwise provide erratic signals. As a result of inaccurate propellant parameter measurements the booster stage engine may prematurely shut down and fail to utilize all available propellant, thus, reducing booster stage performance. Alternatively, the propellant may be depleted beyond a minimum allowable threshold required for proper engine shutdown prior to initiating engine shut down which may result in violation of the engine requirements and/or engine damage.

SUMMARY OF THE INVENTION

In view of the foregoing, a primary object of the present invention is to provide a system for monitoring a cryogenic propellant, irrespective of that propellant being a pure liquid. Another objective of the present invention is to provide a cryogenic depletion monitoring system that is easily adaptable for operation with current launch vehicles.

One or more of the above-noted objectives, as well as additional advantages, are provided by the present invention, which includes a cryogenic depletion monitoring system for use in monitoring a cryogenic propellant in a feed line between a cryogenic storage tank and a booster engine in a space launch vehicle. The cryogenic depletion monitoring system utilizes a processing system, memory, supported logic, and one or more pressure sensor readings to generate one or more parameters related to the propellant in the feed line. The propellant parameters may then be used to determine when to initiate booster engine cut off such that booster stage performance is maximized while no engine requirements are violated.

According to a first aspect of the present invention, a cryogenic propellant depletion monitoring system is provided that includes a processing system containing logic to determine and monitor at least a first propellant parameter associated with the cryogenic propellant in the launch vehicle's cryogenic feed line. Additionally, the system contains control means to initiate engine shut off once at least one of the determined propellant parameters falls below a minimum allowable threshold. The system is operable to determine these propellant parameters and initiate booster engine shutdown irrespective of the cryogenic propellant being a pure liquid.

Various refinements exist of the features noted in relation to the subject first aspect of the present invention. Further features may also be incorporated into the subject first aspect of the present invention as well. These refinements and additional features may exist individually or in any combination. For example, the processing system and the supported logic may utilize any available information for determining the propellant parameters associated with the propellant in the feed line. This information may include, inter alia, algorithms, material constants and/or prior test data that may be stored in an accessible memory structure.

In a preferred embodiment of the present invention, the processing system utilizes at least two pressure measurements associated with the cryogenic system to determine the one or more parameters related to the propellant in the feed line. These pressure measurements may include a first pressure measurement of the propellant from a point along the length of the feed line and a second pressure measurement from the cryogenic storage tank. In this regard, the processing system may utilize the pressure measurements to determine a pressure differential between these two points in the cryogenic system. Preferably, a first set of one or more measurements is taken near the bottom of the feed line and a second set of one or more pressure measurements is taken in the cryogenic propellant storage tank such that a pressure differential across may be calculated across at least a portion of the feed line.

The feed line pressure measurement is indicative of the pressure head at the bottom of the feed line. However, in the case where pressurized ullage gas is utilized to expel the cryogenic propellant from the storage tank, the pressure head will include an ullage gas pressure component. In this regard, the propellant logic is configured to subtract this ullage pressure from the feed line pressure head to produce an "effective" feed line pressure head that represents the head pressure supplied by the propellant independent of ullage pressure. As will be appreciated, this effective feed line pressure head includes the propellant that is in a pure liquid state and propellant that is in a two phase mixture state within the feed line, thus providing a system wherein a feed line pressure head is calculable irrespective of the cryogenic propellant being a pure liquid.

The processing system and its supported logic may further utilize this effective feed line pressure differential (i.e., effective head pressure) to calculate the usable mass of the propellant within the feed line. In this regard, the processing system may utilize one or more additional parameters to determine the feed line mass. For example, to calculate the feed line propellant mass, the physical constraints of the feed line such as length, area and/or volume must be known as well as the density of the cryogenic propellant, which may vary with temperature necessitating propellant temperature to be known. Additionally, in order to calculate a usable mass of the liquid oxygen propellant in the feed line, the effective feed line pressure head may be normalized for launch vehicle acceleration. That is, the effective feed line pressure head may be divided by the current acceleration to eliminate the effects of acceleration on the pressure head and, thus, provide a "normalized" pressure head. This normalized pressure head may then be used to determine the mass of the cryogenic propellant in the feed line.

In order to produce a usable feed line propellant mass, any unusable mass contained a two-phase region within the feed line must be taken into account. In this regard, the processing system may operatively access stored information for determining the usable percentage of feedline propellant. For example, experimental test results from earlier flights or ground tests may be used to determine usable mass percentages compared to a total mass in the feed line. The processor is operative to use this information, such as a predetermined correction factor or "curve", to determine the usable cryogenic propellant mass contained in the feed line.

The processing system is further operative to monitor the determined feed line propellant parameters. In this regard, the processing system is operative to determine minimum allowable requirements for each monitored feed line propellant parameter and then continuously compare the feed line parameters to these minimum allowable requirements. For example, a minimum head pressure requirement may be required at the bottom of the feed line for proper engine operation. In this regard, the processing system may calculate a current minimum required feed line pressure and then compare the effective feed line pressure head to this value. Further, the processing system may simultaneously compare another propellant parameter to another corresponding minimum allowable requirement. Once any of the monitored requirements falls below a minimum allowable threshold, the processing system is operative to issue a command to the controller, which in turn initiates shutdown of the booster engine.

According to a second aspect of the present invention, a method for monitoring cryogenic propellant in a feed line interconnecting a propellant storage tank to a booster engine in a space launch vehicle is provided. The method includes the steps of taking a first pressure measurement associated with the feed line, taking a second pressure measurement associated with the propellant storage tank and utilizing the first and second pressure measurements to determine a propellant pressure differential in the feed line. Finally, the method includes utilizing the pressure differential to calculate at least a first additional propellant parameter associated with the propellant in the feed line.

Various refinements exist of the features noted in relation to the subject second aspect of the present invention. Further features may also be incorporated into the subject second aspect of the present invention as well. These refinements and additional features may exist individually or in any combination. For instance, the method of the second aspect could also include taking multiple pressure readings at one or more points associated with the feed line and/or storage tank to provide increased measurement accuracy and a fail safe redundancy system.

Preferably, the pressure measurements associated with the feed line are taken near the bottom of the feed line while the pressure measurement associated with the propellant storage tank is taken from the propellant storage tank's ullage space. This latter measurement allows determination of the ullage gas pressure, which may then be subtracted from the feed line pressure measurement to determine an effective feed line pressure differential independent of ullage pressure. As will be appreciated this effective feed line pressure differential represents the head pressure supplied by pure liquid propellant and two phase propellant in the feed line.

The step of utilizing the pressure differential to calculate at least a first additional propellant parameter, in a preferred embodiment, includes utilizing the effective pressure head to calculate a usable propellant mass in the feed line. In order to calculate the usable feed line mass, the effective pressure head is normalized by dividing by acceleration to provide a pressure head independent of acceleration. This normalized pressure head is then converted to a propellant mass utilizing one or more stored constants to account for unusable propellant mass contained in a two-phase that may be expected under a given set of conditions. These conditions may include, inter alia, mass flow rate, pressure head and/or geometry of the feed line. In this regard, correction factors determined from prior flights and/or experiments may be utilized to calculate a usable percentage of the remaining propellant mass in the feed line.

The method of the second aspect of the present invention may further comprise comparing the pressure differential and/or an additional propellant parameter, such as usable propellant mass, to corresponding minimum allowable thresholds related to engine requirements. Accordingly, the method includes the step of initiating booster engine shutdown when at least one of the pressure differential and/or the first additional propellant parameter falls below its corresponding minimum allowable threshold. As will be appreciated, this provides a method for monitoring a cryogenic propellant in a feed line that allows the propellant to be utilized up to the last possible moment prior to violating a minimum allowable engine requirement, which may result in permanent engine damage and/or failure.

According to a third aspect of the present intention, a cryogenic propellant depletion monitoring system is provided for monitoring at least a first parameter related to a cryogenic propellant in a feed line interconnecting a propellant storage tank and a booster engine in a space launch vehicle. The system comprises at least a first pressure determining device for determining at least a first pressure associated with the feed line and a processing platform configured to receive and utilize this first pressure for determining at least one parameter associated with the cryogenic propellant in the feed line. In order to determine the cryogenic propellant parameter(s), the processing platform is further operable to accessing a memory structure that contains information and/or instructions for use in producing the propellant parameters. For example, the memory structure may contain pertinent material constants related to the cryogenic propellant as well as protocols/algorithms for use in calculating one or more propellant parameters. Finally, the system contains a controller in communication with processing platform for initiating booster engine shutdown when one of the determined propellant parameters drops below a predetermined value.

The system's pressure determining device(s) may be any device operable to provide the desired pressure measurement associated with the feed line, such as a pressure transducer. In a preferred embodiment a plurality of pressure measurement devices are utilized to provide a feed line pressure. In order to provide consistency amongst the plurality of pressure measurement devices, these devices must measure the feed line pressure at the same point. In this regard, the preferred embodiment utilizes a manifold in fluid communication with the feed line. That is, the manifold is interconnected to the feed line while the plurality of pressure determining devices are interconnected to the manifold. As will be appreciated, the pressure within the manifold is equal to the pressure at the feed line connection point. In this regard, the plurality of pressure determining devices interconnected to the manifold each effectively provide a measurement at the same point along the feed line. The plurality of pressure measurements allows for increased measurement accuracy as well as a fail safe redundancy system. For example, the plurality of measurements may be averaged or center selected to provide a more accurate pressure measurement.

The system may utilize a second pressure determining device to determine a pressure associated with the storage tank, which may also be utilized in determining propellant parameters associated with the cryogenic propellant. Again, any suitable pressure sensor may be utilized to provide the storage tank pressure. However, the launch vehicle may utilize a constant pressurization system for the storage tank where the pressure within the storage tank remains a predetermined constant value. Accordingly, in this embodiment, a separate pressure determining device will not be utilized, rather, the known storage tank pressure may be stored within the memory structure for use by the processing platform as needed.

The system's processing platform could be a single processing device or a group of inter-operational processing devices so long as the processing system is operable to perform the desired functions for producing the propellant parameters. In this regard, the processing platform may be configured within an existing processor of the space launch vehicle. That is, an existing computer, such as a flight control computer, may provide the necessary functionality for the processing platform. Alternatively, the processing platform may be a stand alone unit configured to independently produce the propellant parameters. Irrespective of the platform used, the processing platform is operatively connected to a memory structure containing the necessary instructions which can be retrieved and executed by the processing platform to produce the desired propellant parameters. The memory structure may be any appropriate storage media such as disks, tapes, integrated circuits, etc.

The pressure measurement devices may be directly interconnected to the processing platform through an interface associated with the processing platform. That is, the pressure measurement devices may be electrically interconnected to, for example, an analog to digital converter which receives analog signals from the devices and provides digital outputs of these signals to the processing platform for use in determining the propellant parameters.

DETAILED DESCRIPTION

Reference will now be made to the accompanying drawings, which assist in illustrating the various pertinent features of the present invention. In the following description, the invention sets forth a Cryogenic Propellant Depletion system for a launch vehicle that is particularly useful for monitoring propellant levels in spite of the existence of two-phase conditions within the propellant. It will be appreciated that the specific launch vehicle type, propellant types and other details set forth below are provided for purposes of illustration and that the invention is not limited to any such specifics.

Figure 1:
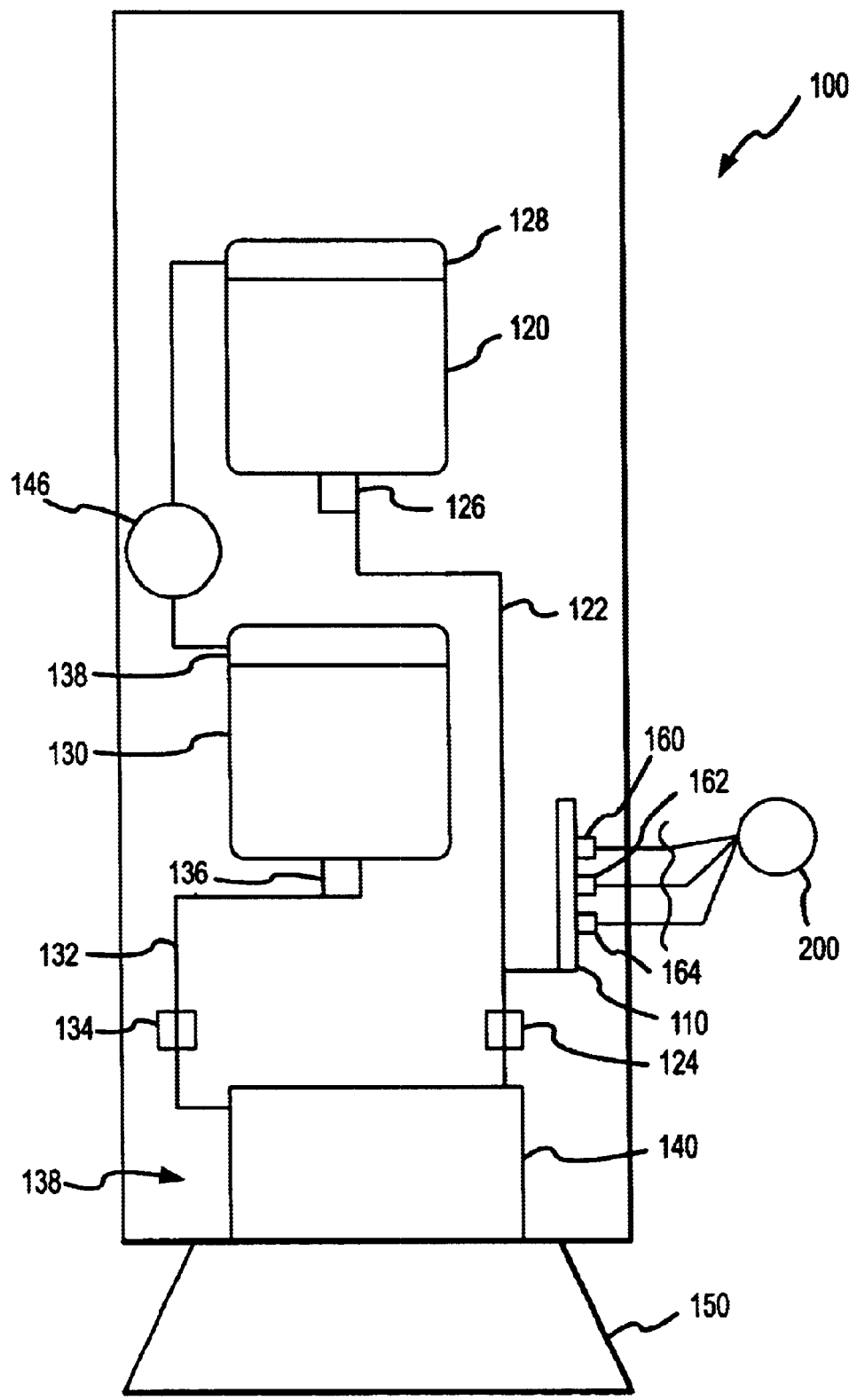
FIG. 1 is a block diagram of a launch vehicle in which the present invention may be utilized.

Referring to FIG. 1 a portion of a launch vehicle 100 of the type in which the present invention may be implemented, is shown. Generally the launch vehicle 100 is used to launch a payload from the Earth's surface into orbit. The thrust necessary to launch the payload into orbit is provided by a first booster stage 102 and second upper stage (not shown). The booster stage 102 is designed to launch and deliver the payload a predetermined distance above the earth before exhaustion and separation from the second stage, at which time the booster stage 102 falls back to the Earth's surface. As shown in FIG. 1, the booster stage 102 includes a rocket engine 138 which comprises various elements, such as a combustion chamber 140 and a directional nozzle 150. The booster stage 102 also includes a liquid oxygen tank 120 and a rocket fuel tank 130. Each of these tanks 120, 130 carries what may be termed liquid propellants and more particularly in the case of the liquid oxygen tank 120 a cryogenic liquid propellant. A feed line 122 provides an outlet from the liquid oxygen tank 120 to a booster pump 124. A separate feed line 132 provides an outlet from the rocket fuel tank 130 to a second booster pump 134. The booster pumps 124, 134 supply the liquid oxygen and rocket fuel to the combustion chamber 140 where they are contacted to provide combustion. The combustion product is expelled from the nozzle 150 to produce thrust. In addition, each feed line 122, 132 contains a valve 126, 136 for controlling the flow of the propellants to their respective booster pumps 124, 134.

As shown, the feed lines 122, 132 are located generally on the bottom of their propellant tanks 120, 130. During ascent of the launch vehicle 100, forces due to gravity and acceleration direct the liquid oxygen and fuel into their feed lines 122, 132 to supply their respective booster pumps 124, 134, which force the liquid oxygen and fuel into contact in the combustion chamber 140. In addition to utilizing gravity and acceleration to expel the liquid oxygen and fuel from the tanks 120, 130, most systems introduce a high-pressure gas into the propellant tank's "ullage space" 128, 138 (i.e., the part of the tank not occupied by the liquid propellant) to force the propellants into their feed lines 122, 132. Typically, helium is used as a pressurizing ullage gas due to its low molecular weight and chemically inert properties, however other gases may also be utilized. A separate ullage gas supply system may be utilize in which a stored supply 146 of the ullage gas is introduced at a constant pressure, e.g., using a regulator (not shown), into the ullage spaces 128, 138 of each propellant tank 120, 130 as the propellants are depleted. Alternatively, a fixed amount of ullage gas may be loaded into the propellant tanks 120, 130 prior to launch. In this regard, the fixed amount of ullage gas expands as the propellant is depleted from the tanks 120, 130, accordingly, as the ullage space increases, the ullage gas pressure drops. Regardless of the ullage gas system utilized, what is important is that some sort of pressurized gas is present within the cryogenic liquid oxygen tank 120 that, due to a variety of possible factors, such as high flow rate, tank geometry, feed line geometry, propellant sloshing etc., may enter into the feed line 122 prior to the liquid oxygen completely draining into the feed line 122. This situation is known as "pullthrough" and creates a frothy two-phase region (liquid oxygen/gaseous helium, LOX/GHe) in the feed line 122 making measurements of the remaining cryogenic liquid oxygen problematic.

The launch vehicle 100 also contains three pressure sensors 160–164 connected to and operable to measure the pressure within a manifold 110. This manifold 110 is fluidly interconnected to a point near the bottom of the liquid oxygen feed line 122 by a length of tubing 112. Accordingly, the pressure within the manifold is substantially the same as the pressure at that point in the feed line 122. The pressure sensors 160, 162, and 164 measure the manifold pressure and the resultant signals are provided to a flight computer 202. The use of three pressure sensors 160, 162, and 164 provides for increased measurement accuracy and a fail-safe redundancy system. However, it will be appreciated, the present invention may utilize a single pressure sensor or any other means to determine a pressure associated with the feed line 122.

Figure 2:
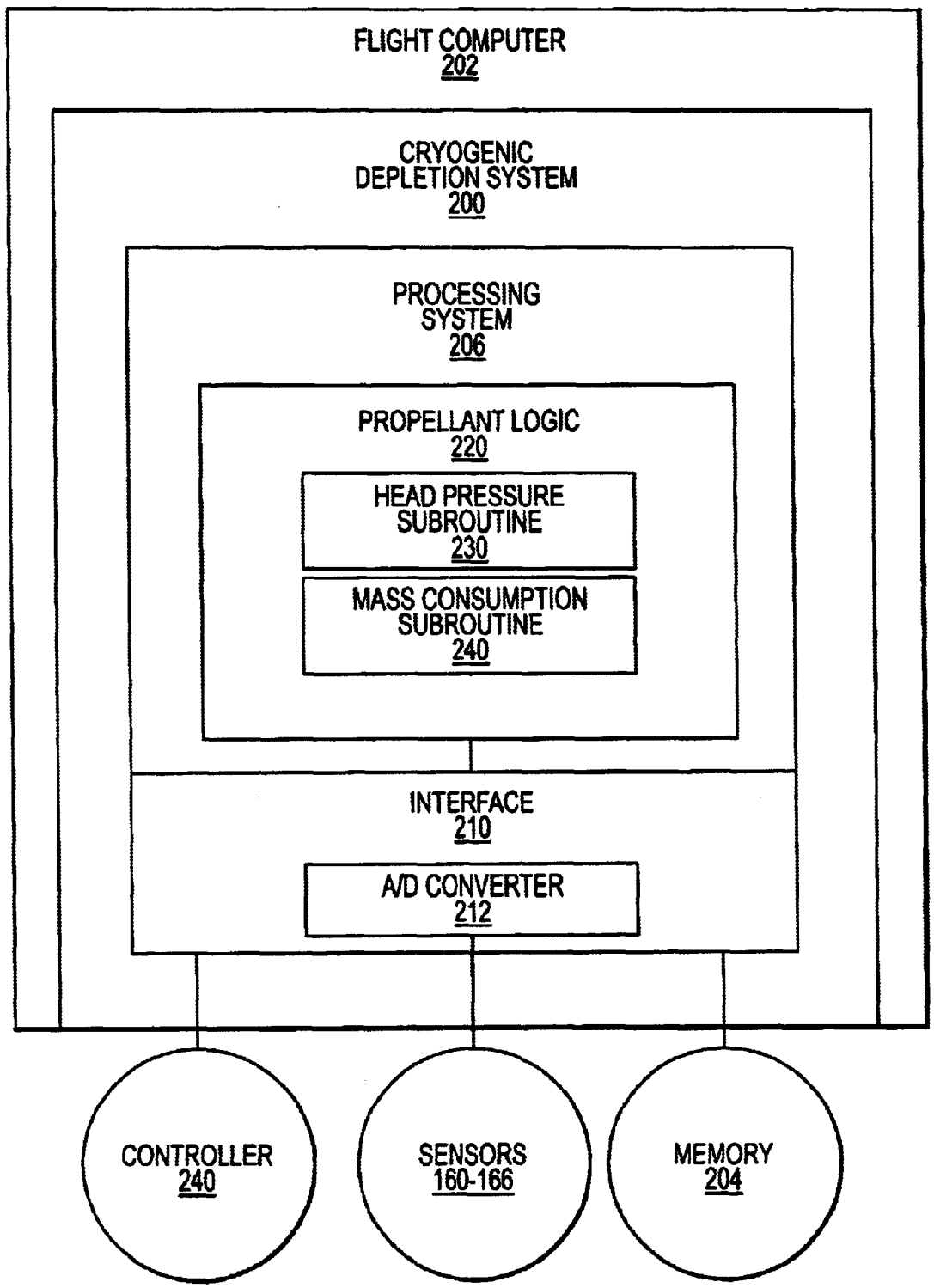
FIG. 2 is one embodiment of a system architecture that includes a Cryogenic Depletion System.

FIG. 2 shows a system architecture that includes one embodiment of a Cryogenic Depletion System ("CDS") 200 for use with a cryogenic liquid oxygen system. As shown in FIG. 2, the CDS 200 is contained in a flight computer 202 of the launch vehicle 100. This flight computer 202 could be one or more processors that control operation of various systems of the launch vehicle including, for example, the CDS 200. Those skilled in the art will appreciate that the flight computer 202 could be a stand-alone device or be included as part of other devices. Furthermore, the flight computer 202 could also be a processing platform including one or more individual processors programmed to operate in concert to operate various systems of the launch vehicle. In this regard, the flight computer 202 may be a plurality of electrically interconnected components located in one or more locations on the launch vehicle 100. For example, the CDS 200 may be a stand-alone unit in the booster stage 102 that is in communication with other processors that collectively make up the launch vehicle's flight computer 202.

The CDS 200 generally comprises a processing system 206 having an interface 210 electrically interconnected to the three pressure sensors 160, 162 and 164 (See FIG. 1). The CDS 200 also receives an ullage gas pressure from the liquid oxygen tank 120. As will be appreciated, in this launch vehicle configuration, the ullage gas supply 146 provides a constant ullage pressure, therefore, in the present embodiment the ullage pressure is a known constant. However, other systems may utilize a pressure sensor or other means to determine the ullage pressure. The CDS processing system 206 could be a stand-alone device or be included as part of other devices such the launch vehicle's flight computer 202. Some examples of processing devices are integrated circuits and logic circuitry. The logic elements can be comprised of instructions that are stored on storage media or memory 204. Those instructions can be retrieved and executed by the processing system 206. Some examples of instructions are software, program code, and firmware. Some examples of storage media are memory devices, tape, disks, integrated circuits, and servers. In particular, the memory 204 accessibly stores at least a first set of calibration information for use in producing pressure measurements from signals provided by the pressure sensors 160–164, and a second set of calibrator information for use in determining propellant mass, each of which will be more fully described herein. The instructions are operational when executed by the processing system 206 to direct the processing system 206 to operate in accord with the invention.

The interface 210 could be any device or group of devices operative to receive signals from the pressure sensors 160–164 and/or other systems. For example, the interface 210 may provide access for the CDS 200 to the memory structure 204 containing the calibration information that may be utilized by the CDS 200 for propellant parameter determination. Additionally, the interface 210 interconnects the CDS to a controller 240 that is operative to effectuate engine shutdown upon issuance of a shutdown command from the CDS 200. Further, the interface 210 also includes an analog to digital ("A/D") converter 212 operative to receive incoming analog signals from the pressure sensors 160–166 and convert these to digital signals. The output of the A/D converter is provided to the processing system 206.

The CDS 200 utilizes the various pressure signals provided by the pressure sensors 160–164 as well as flight parameters that may be obtained from, for example, the flight computer 202 to determine and monitor one or more parameters of the liquid oxygen propellant in the feed line 122. In this regard, the CDS's processing system 206 supports propellant logic 220 to determine these feed line propellant parameters. In particular the propellant logic contains sub-routines 230 and 240 for determining a head pressure associated with the liquid oxygen near the booster pump 124 inlet (i.e., bottom of the feed line 122) and for determining the mass of the remaining liquid oxygen in the liquid oxygen tank 120 and/or feed line 122, respectively.

Figure 3:
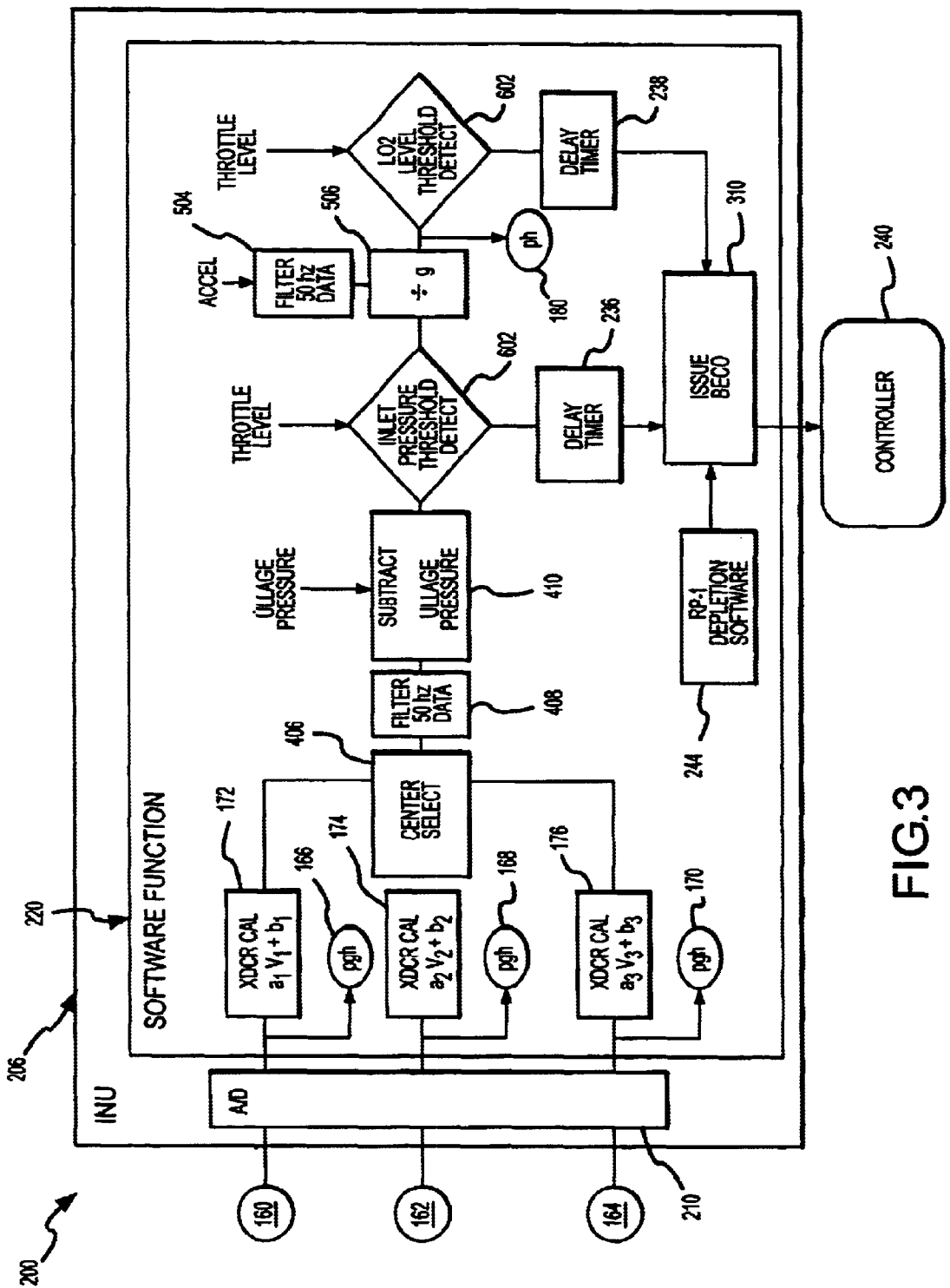
FIG. 3 is a block diagram of the propellant Logic of the present invention.
Figure 4:
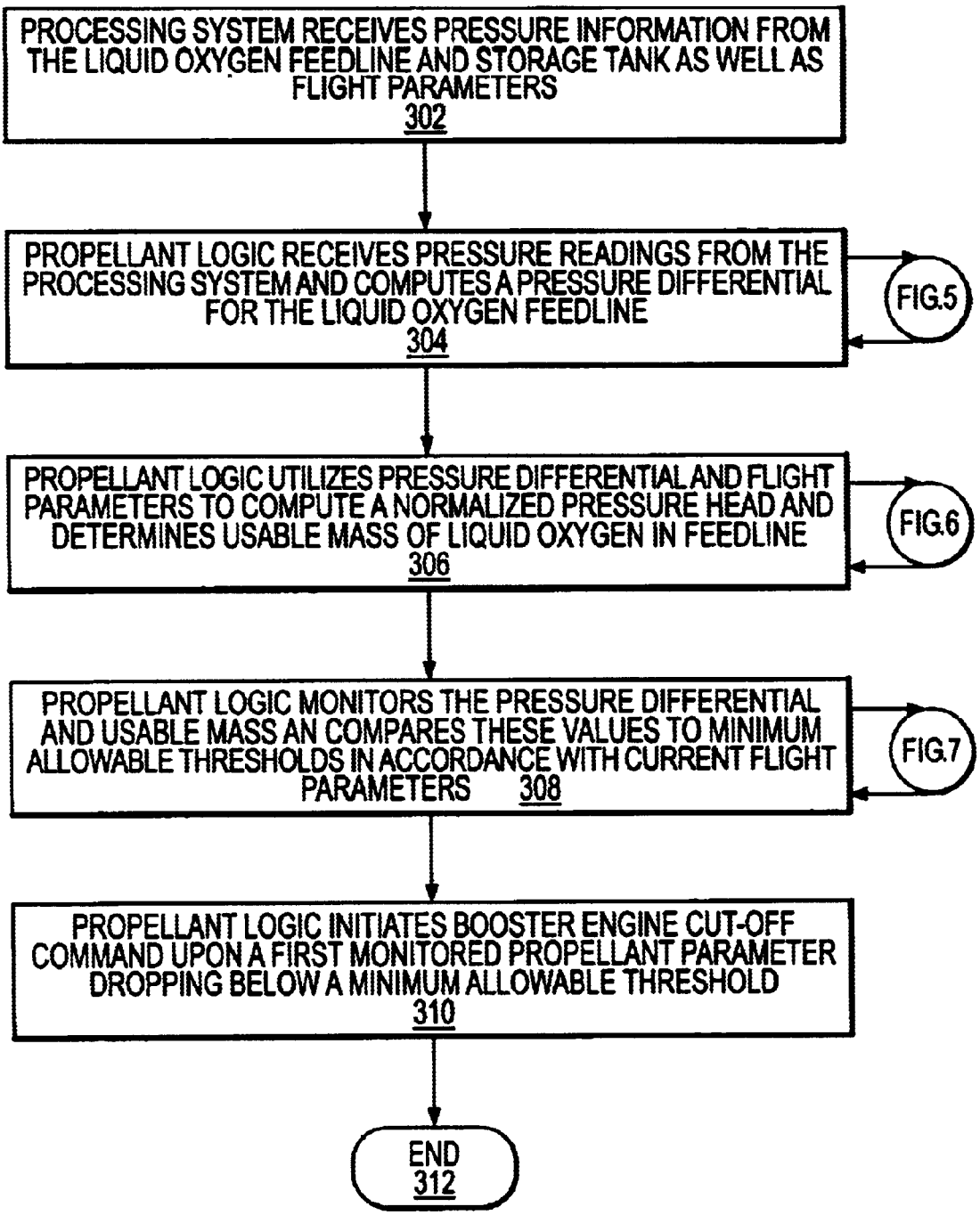
FIG. 4 is a flow chart of protocol that may be utilized by the propellant Logic of the present invention.
Figure 5:
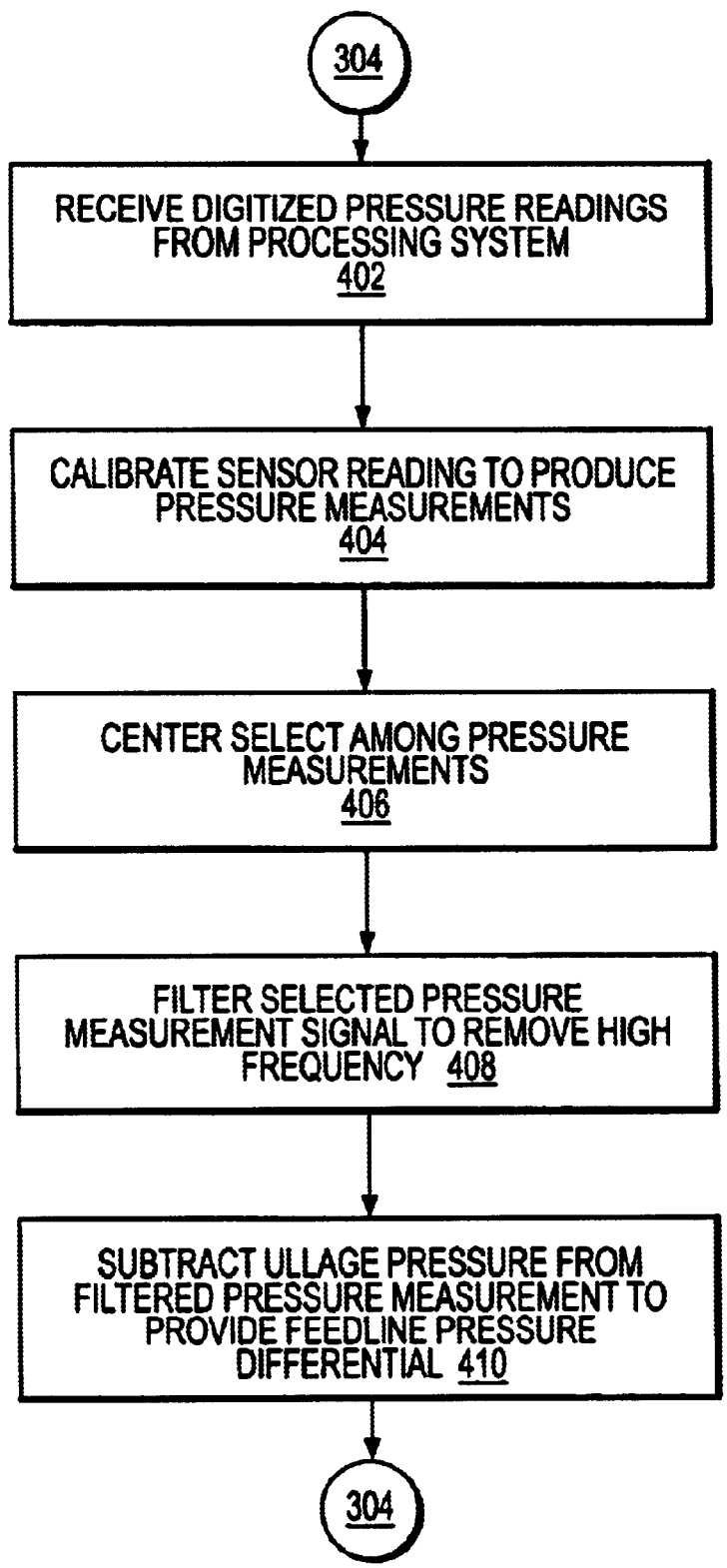
FIG. 5 is a flow chart of the steps utilized by the protocol of FIG. 4 in determining an effective feed line pressure differential.
Figure 6:
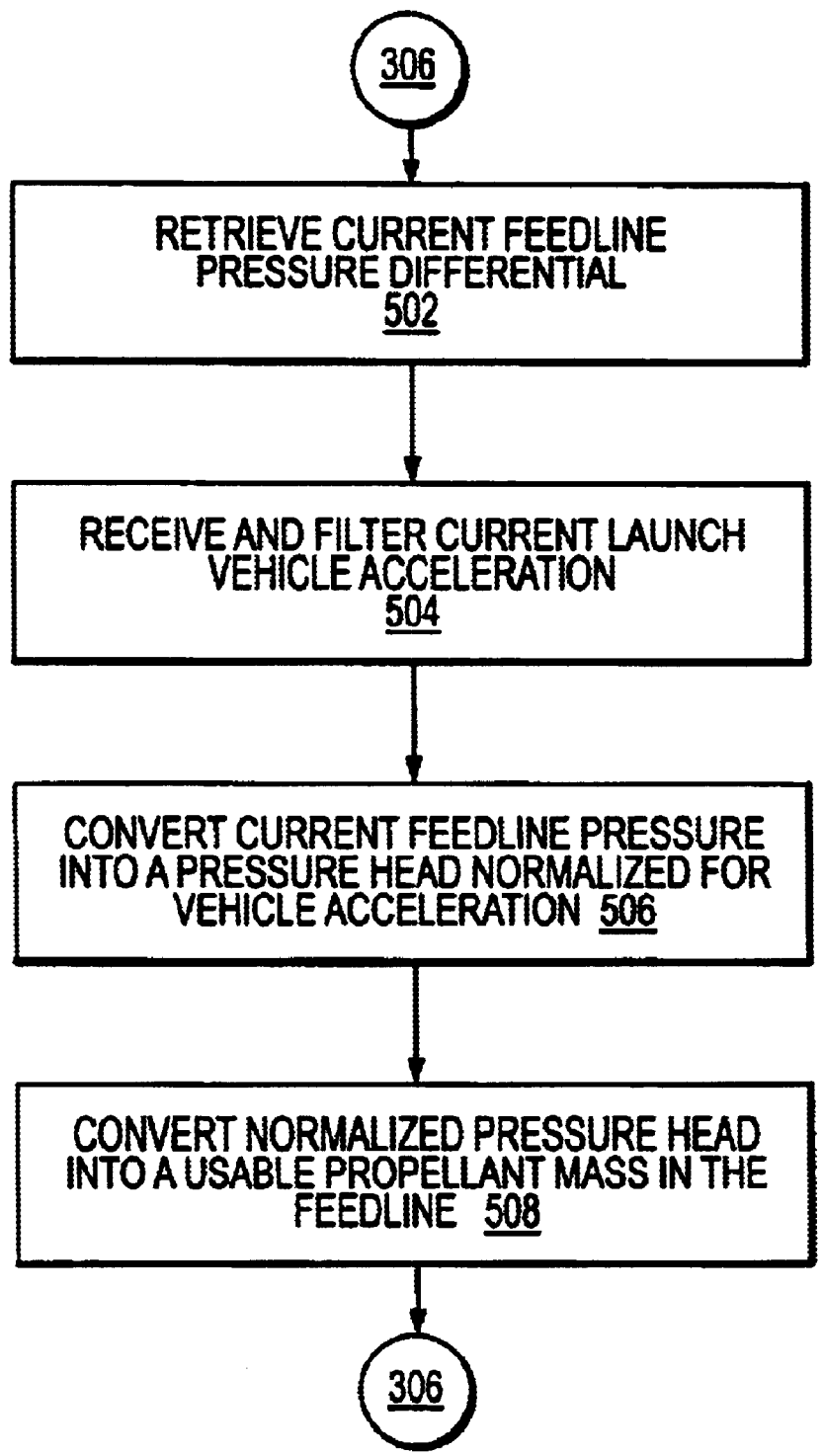
FIG. 6 is a flow chart of the steps utilized by the protocol of FIG. 4 in determining a usable feed line propellant mass.
Figure 7:
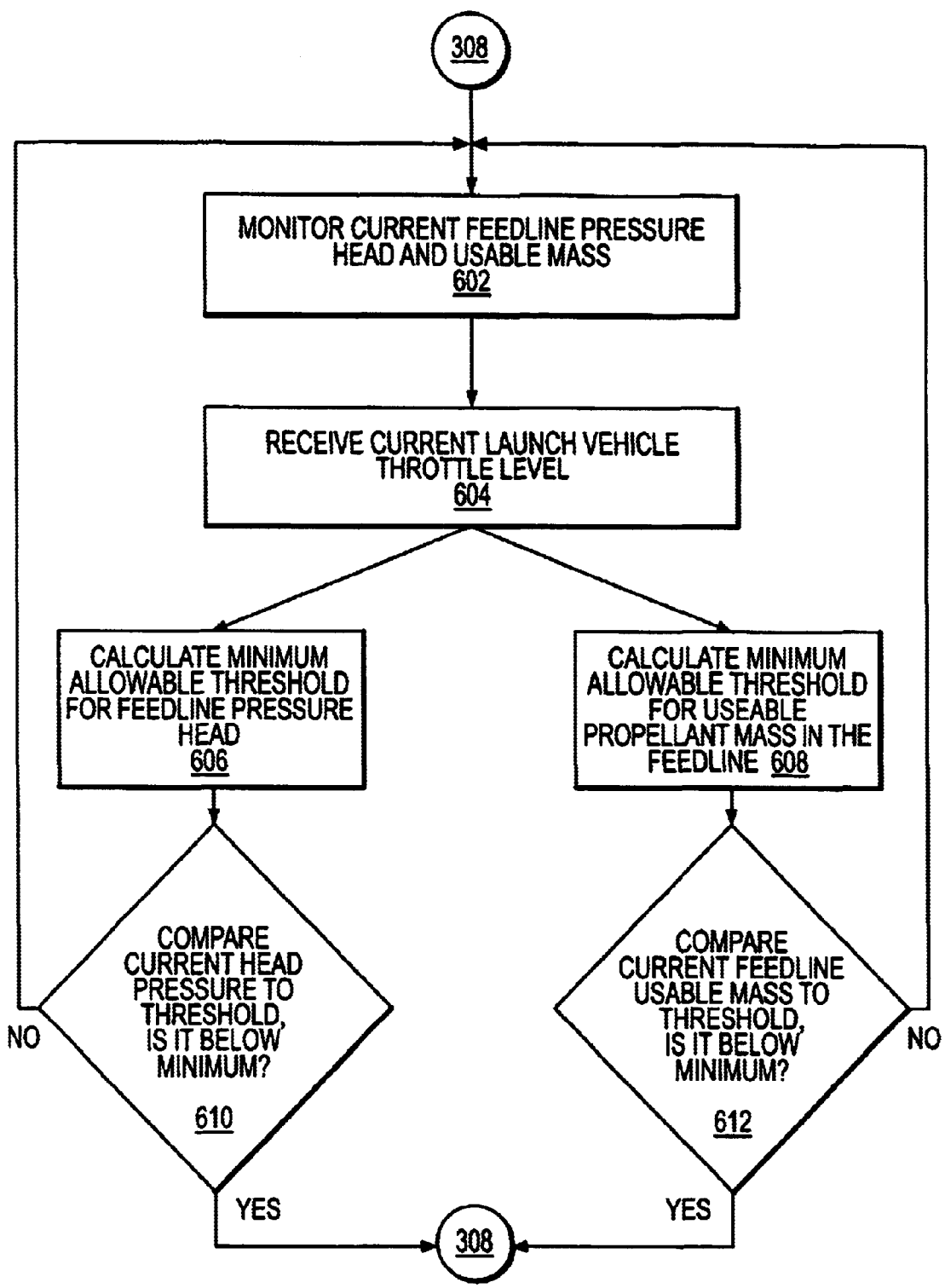
FIG. 7 is a flow chart of the steps utilized by the protocol of FIG. 4 in comparing the propellant parameters to minimum allowable thresholds.

The propellant logic 220 could be any logic or circuitry that operates under the control of the processing system 206 to determine the desired feed line propellant parameters. One embodiment of the propellant logic 220 is described in FIG. 3, which is a block diagram illustrating the steps taken by the propellant logic 220. As shown in FIG. 3, the processing system 206 and its resident propellant logic 200 are configured into an existing component of the launch vehicle, particularly, the inertial navigation unit (INU). FIG. 4 is one embodiment of a cryogenic depletion monitoring protocol that may be utilized by the propellant logic 220. FIGS. 5–7 are flow charts which further illustrate three of the steps described by the protocol of FIG. 4. The operation begins at step 302 where the processing system 206 receives sensor readings from pressure sensors 160, 162, and 164 and various flight parameters, e.g., ullage pressure, throttle level, and acceleration.

At step 304, the propellant logic 220 receives (402) (See FIG. 5) the three digitized pressure signals from the processing system's A/D converter 212. At this point, the pressure signals each represent the combined pressure applied by the cryogenic propellant's density, $\rho$, the height, h, of the propellant in the feed line 122 and/or storage tank 120 and the additional force applied on the propellant by acceleration, g, as noted by notations 166, 168, and 170 in FIG. 3. In addition, these $\rho$gh pressure signals include a pressure component exerted by the ullage gas pressure, as will be more fully discussed herein. These pressure readings indicate the combined head pressure at a point near the bottom of the liquid oxygen feed line 122 near the booster pump 124. In order to utilize the digitized pressure readings, they must be calibrated (404). Calibration (404) entails utilizing, for example, individual calibration curves 172, 174, and 176 (stored in the memory 204) for each pressure sensor 160, 162, and 164. These curves may include a plurality of calibration constants (a1-a3 and b1-b3) for use with the digitized pressure signals, e.g., voltages V1-V3, to produce accurate pressure measurements.

The propellant logic 220 then center selects (404) (i.e., throws out the high and low sensor measurements and utilize the center reading) among the three calibrated feed line pressure measurements. The selected pressure measurement is then filtered (408) to remove any high frequency noise after which the propellant logic 220 then subtracts (410) the ullage pressure from the filtered pressure measurement. This produces an effective pressure differential that represents the head pressure supplied by the cryogenic propellant independent of the ullage pressure near the inlet of the booster pump 124. As will be appreciated by those skilled in the art, the liquid oxygen booster pump 124 generally requires a minimum inlet head pressure to prevent cavitation, which may result in a loss of pressure and/or volume of liquid oxygen supplied to the combustion chamber 140.

At step 306, the propellant logic 220 utilizes the effective feed line pressure differential, which represents the pressure head supplied by the liquid and two-phase propellant in the feed line, and various flight parameters to determine the mass of usable liquid oxygen present within the feed line 122. In particular, the propellant logic 220 receives (502) (See FIG. 6) the current feed line head pressure. Next, the propellant logic receives (504) the current acceleration provided by, for example, an accelerometer. This acceleration signal may also be filtered to remove any high frequency noise. The propellant logic 220 then converts (506) the effective feed line head pressure into a head pressure normalized for acceleration by dividing the effective head pressure by the current acceleration ("g"). The resulting "unit-g" pressure head is dependant only on the density of the propellant, $\rho$, and the height of the propellant in the feed line 122 and/or storage tank 120, as noted by notation 180 in FIG. 2. The unit-g pressure head is then converted to an equivalent usable liquid oxygen mass contained in the feed line 122. The second conversion (508) step may require use of various mathematical algorithms and/or material constants as well as geometric constraints (feed line diameter, length etc). Additionally, if two-phase conditions are expected to exist within the feed line 122 (as will be anticipated by system measurements such as flow rate, and unit g head pressure) a portion of the propellant mass contained in a two-phase region may be unusable. The unusable mass may be accounted for by utilizing stored constants/calibration curves produced from data produced in simulation tests and/or previous flights. That is, the propellant logic may select/calculate an expected usable mass using the current system conditions. For example, a head pressure of X may correspond to a condition where there is no expected two-phase conditions in the feedline. In this case, a feedline volume times density will produce the usable mass. In a second situation where a head pressure of Y exists, there may be expected to be some pull through of ullage gas; therefore, based on test data it may be expected that a portion of the volume of the feedline is filled with a two-phase mixture of propellant and ullage gas. Further, test data may indicate half of this two-phase mixture is unusable. The total usable mass within the feedline may then be calculated using correction factors (i.e., usable propellant mass curves) or from a look-up table. Further, additional system conditions may affect the usable mass. For example, a higher propellant flow rate caused by a higher launch vehicle throttle setting may cause additional pull through and a higher percentage of two-phase mixtures within the feedline. Therefore, calibration curves accounting for multiple variables and/or multiple lookup tables may be utilized to predict usable feedline mass. Accordingly, these tables and/or calibration curves are contained in the memory 204 accessible by the propellant logic 220.

At step 308, the propellant logic 220 simultaneously monitors (602) (See FIG. 7) the current feed line pressure differential (pressure head) and the usable mass against minimum allowable engine requirements. In this regard, the propellant logic 220 receives (604) the launch vehicle's current throttle level, which generally effects the minimum engine requirements for both head pressure and the liquid oxygen mass required for proper engine shutdown.

Accordingly, the propellant logic 220 utilizes the throttle level information to select (i.e., from a look-up table) or simultaneously calculate (606 and 608) current minimum allowable thresholds for each propellant parameter. For example, a mass consumption versus throttle level curve or other look-up table may be accessed by the propellant logic 220 to determine the minimum propellant shutdown mass requirement for a current throttle level.

The propellant logic 220 then compares (610) the current pressure head differential to the current minimum allowable head pressure threshold, beneath which the will engine fail to properly function. Simultaneously, the propellant logic 220 compares (612) the current usable liquid oxygen mass to the minimum threshold requirement for proper engine shutdown (i.e., shutdown mass consumption requirement). As will be appreciated, by simultaneously monitoring both primary engine requirements, shutdown may be effectuated prior to an engine damaging event taking place irrespective of which propellant parameter first drops beneath its allowable minimum threshold. It should also be noted that the above-described protocol is a continuous process operating the entire time the booster stage engine 140 is active. In this regard, propellant parameters along with corresponding minimum allowable thresholds are constantly calculated and monitored to achieve proper engine shut down while maximizing the utilization of the cryogenic propellant.

Upon one of the feed line head pressure and usable feed line propellant mass dropping below its minimum allowable threshold, the shutdown logic 240 initiates (310) booster engine cut off. In this regard, the propellant logic 220 issues a command to the controller 240 to begin the process of shutting down the booster engine 140 prior to any primary engine requirements being violated. As will be appreciated, the sequence of booster engine cut off is generally specific for each launch vehicle 100 but could involve, inter alia, turning off one or both of the liquid oxygen and fuel valves 126, 136 immediately or at a predetermined time after detection of the propellant parameter falling below the minimum allowable threshold. In this regard, the propellant logic 220 may utilize delay timers 236, 238 (see FIG. 3) to delay the issuance of a cut off command until a predetermined time after violation of a minimum allowable threshold. Finally, it should be noted that an RP-1 (i.e., fuel) depletion monitoring system 244 may also be utilized simultaneously for monitoring the typically non-cryogenic fuel. In this regard, if the fuel is depleted beyond a minimum allowable threshold prior to either the liquid oxygen feed line head pressure or feed line usable mass falling below a minimum threshold, the fuel depletion monitoring system 244 will initiate booster engine cut-off.

Those skilled in the art will appreciate variations of the above-described embodiments that fall within the scope of the invention. As a result, the invention is not limited to the specific examples and illustrations discussed above, but only by the following claims and their equivalents.

What is claimed:

1. A cryogenic propellant depletion monitoring system for monitoring cryogenic propellant in a feed line between a propellant storage tank and a booster engine in a space launch vehicle, said system comprising:

a processing system configured to determine and monitor a pressure differential associated with liquid and two-phase cryogenic propellant in said feed line;

said processing system being further operative to utilize said pressure differential to determine at least one additional propellant parameter; and control means to initiate booster engine shutdown upon at least one of pressure differential and said at least one additional propellant parameter falling below a minimum allowable threshold.

2. The system of claim 1, wherein said processing system utilizes at least first and second pressure measurements to determine said pressure differential.

3. The system of claim 2, wherein said first and second pressure measurements comprise at least one pressure measurement associated with said feed line and at least one pressure measurement associated with said storage tank.

4. The system of claim 3, wherein said at least one pressure measurement associated with said feed line comprises at least one pressure measurement taken near the bottom of said feed line.

5. The system of claim 4, wherein a plurality pressure measurements are taken.

6. The system of claim 3, wherein said pressure measurement associated with said storage tank is a pressure measurement associated with an ullage space in said storage tank.

7. The system of claim 6, wherein said ullage space pressure measurement is a known constant value.

8. The system of claim 2, wherein said processing system contains propellant logic operative to utilize said pressure differential determine said additional propellant parameters.

9. The system of claim 8, wherein said propellant logic is operative to determine minimum allowable thresholds for said pressure differential and each said additional propellant parameter.

10. The system of claim 9, wherein said propellant logic is configured to continuously and simultaneously compare said pressure differential and each said additional propellant parameter to a corresponding minimum allowable threshold.

11. The system of claim 10, wherein said propellant logic is configured to issue a shutdown command to said controller to initiate booster engine shutdown upon any parameter falling below a corresponding minimum allowable threshold.

12. The system of claim 8, wherein said propellant logic is operative to utilize said pressure differential to calculate a usable mass of said cryogenic propellant in said feed line.

13. The system of claim 12, wherein said propellant logic utilizes said pressure differential associated with said propellant in said feed line and at least a first flight parameter to determine said usable propellant mass.

14. The system of claim 13, wherein said flight parameters include at least one of acceleration, propellant flow rate, and propellant density.

15. The system of claim 8, wherein said propellant logic is configured to subtract a pressure associated with said storage tank from a pressure associated with said feed line to provide said pressure differential, wherein said pressure differential represents the head pressure supplied by said propellant irrespective of said propellant being a pure liquid.

16. The system of claim 14, wherein said propellant logic is operative to access and utilize stored information to calculate said usable propellant mass in said feed line.

17. A method for monitoring cryogenic propellant in a feed line interconnecting a propellant storage tank to a booster engine in a space launch vehicle, said method comprising the steps:

obtaining a first pressure measurement associated with said feed line;

obtaining a second pressure measurement associated with said propellant storage tank;

obtaining at least one current flight parameter of said launch vehicle;

first utilizing said first and second pressure measurements and said at least one flight parameter to determine a propellant pressure head supplied by liquid and two-phase propellant is said feed line; and second utilizing said pressure head to calculate at least a first additional propellant parameter associated with said feed line propellant.

18. The method of claim 17, wherein said first obtaining step further comprises obtaining a pressure measurement near the bottom of said feed line and said second obtaining step further comprises obtaining a pressure measurement of an ullage gas in said storage tank.

19. The method of claim 18, wherein said first utilizing step further comprises subtracting said ullage gas pressure from said bottom feed line pressure to determine said feed line pressure differential.

20. The method of claim 17, wherein said second utilizing step utilizes said pressure head to calculate a usable propellant mass in said feed line.

21. The method of claim 20, wherein said step of calculating said usable mass comprises utilizing said at least one current flight parameter of said launch vehicle to produce a pressure head independent of vehicle acceleration.

22. The method of claim 21, wherein said calculating step further comprises utilizing stored material constants to produce said usable mass, wherein said usable mass accounts for pure liquid propellant and two-phase propellant in said feed line.

23. The method of claim 17, further comprising:

comparing at least one of said pressure head and said at least a first additional propellant parameter to at least a first minimum allowable threshold.

24. The method of claim 23, wherein said minimum allowable thresholds are related to booster engine requirements.

25. The method of claim 24, wherein said booster engine requirements include at least one of a net positive suction pressure and a propellant mass requirement for shutdown.

26. The method of claim 23, further comprising:

initiating booster engine shut down when at least one of said pressure head and said at least a first additional propellant parameter fall below a corresponding minimum allowable threshold.

27. A cryogenic propellant depletion monitoring system for monitoring cryogenic propellant in a feed line between a propellant storage tank and a booster engine in a space launch vehicle, said system comprising:

at least a first pressure determining device for determining at least one of:
    a pressure measurement associated with said feed line; and
    a pressure measurement associated with said storage tank;

a processing platform configured to receive said pressure measurements and utilize said pressures to determine a pressure head of liquid and two-phase cryogenic propellant in said feed line;

a memory structure in communication with said processing platform for storing at least a first set of calibration information for use by said processing platform in utilizing said pressure head to determine at least one additional propellant parameter; and a controller in communication with said processing platform for initiating booster engine shutdown upon a command from said processing platform.

28. The system of claim 27, wherein a first pressure determining device further comprises:

a manifold in fluid communication with said feed line;

at least one pressure sensor interconnected to said manifold for providing a signal associated with a pressure within said feed line.

29. The system of claim 28, wherein a plurality of pressure sensors are interconnected to said manifold, said sensors providing a plurality of signals associated with a pressure within said feed line.

30. The system of claim 28, wherein a second pressure determining device comprises:

at least a first pressure sensor being adapted to provide a signal associated a pressure within said storage tank.

31. The system of claim 27, further comprising a constant pressure system for maintaining a constant pressure within said storage tank, wherein said at least a first pressure associated with said storage tank is known constant value.

32. The system of claim 27, wherein said processing platform is configurable within a flight control system of said space launch vehicle.

33. The system of claim 27, wherein said processing platform is a stand alone unit.

34. The system of claim 27, wherein said processing platform further comprises:

an interface for interconnecting said processing platform to said at least one pressure determination device, said interface comprising an analog to digital converter operative to receive analog signals from said at least one pressure determination device and provide digital signals for use in determining said pressure head.

35. The system of claim 34, wherein said memory includes at least one of:

one or more calibration curves for use with the outputs of one or more of said pressure determining devices to produce a pressure head; and one or more feed line mass calibration curves for use with said pressure head for calculating a propellant mass within said feed line.

* * * * *

UNITED STATES PATENT AND TRADEMARK OFFICE
CERTIFICATE OF CORRECTION

PATENT NO.     : 6,695,256 B2
DATED          : February 24, 2004
INVENTOR(S)    : Zeender et al.

It is certified that error appears in the above-identified patent and that said Letters Patent is hereby corrected as shown below:

Column 12,
Line 2, after the word "of", insert -- said --.

Column 13,
Line 4, delete the word "is", and insert therefor -- in --.

Signed and Sealed this

Seventh Day of June, 2005

JON W. DUDAS
*Director of the United States Patent and Trademark Office*